April 26, 1955     F. P. STROTHER     2,707,085
AUTOMATIC PILOTS
Filed Feb. 23, 1949
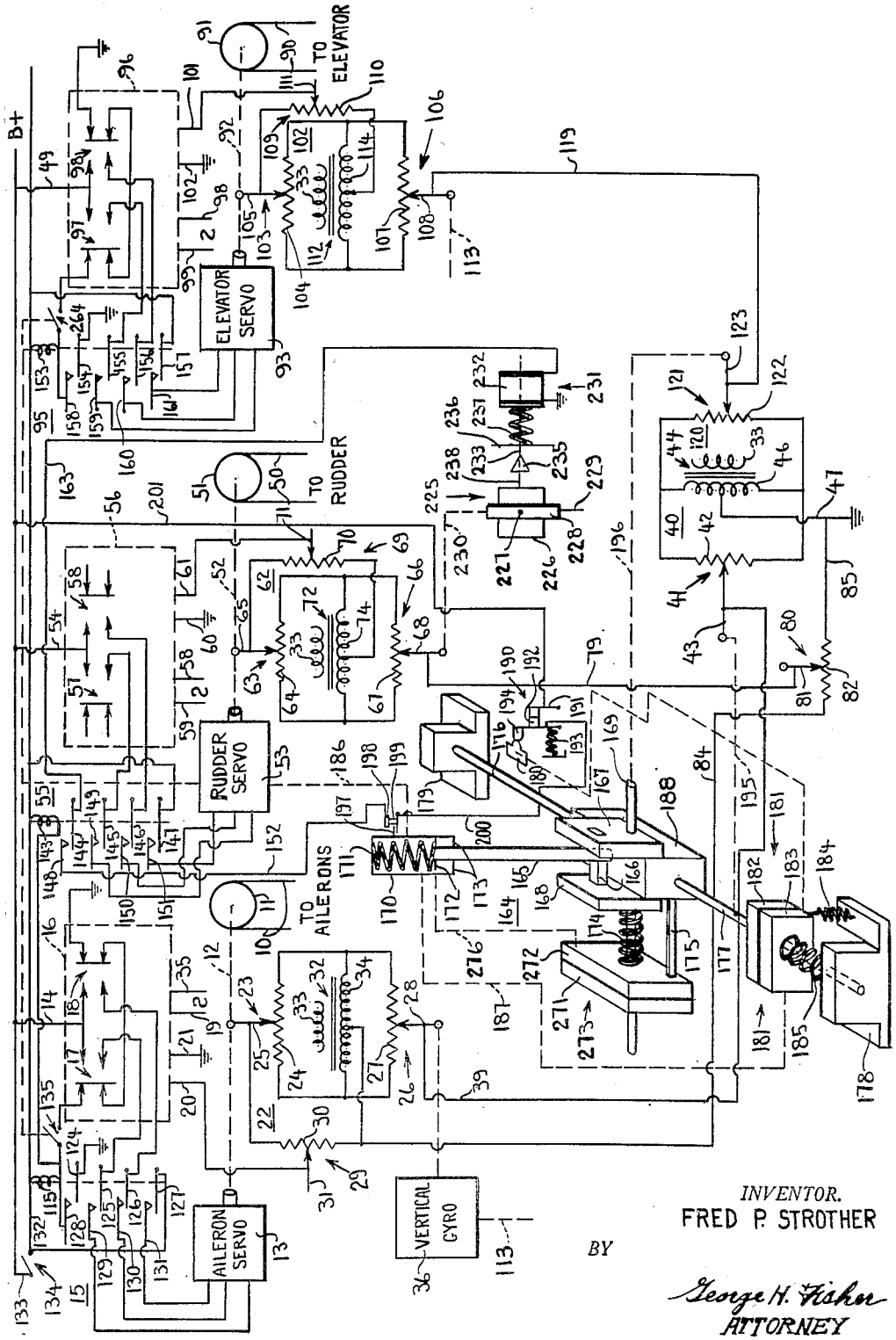
INVENTOR.
FRED P. STROTHER
BY
*George H. Fisher*
ATTORNEY

United States Patent Office

2,707,085
Patented Apr. 26, 1955

2,707,085

AUTOMATIC PILOTS

Fred P. Strother, Shawmut, Ala., assignor to Minneapolis-Honeywell Regulator Company, Minneapolis, Minn., a corporation of Delaware Application February 23, 1949, Serial No. 77,736

14 Claims. (Cl. 244—77)

This invention pertains to directional control apparatus for dirigible craft which apparatus is conventionally termed an automatic pilot. An automatic pilot for an aircraft generally includes provisions for operating by power means the control surfaces for stabilizing the aircraft with respect to the turn, pitch and the roll axes. Such stabilizing is achieved by making the power means responsive to control signals derived from a system including attitude responsive devices. The signals result from the operation of the attitude responsive devices of the system as a result in a change in the normal condition of the system.

Normally the control surface power means is not operatively associated with said control surfaces but may be operatively engaged therewith. It is generally undesirable to operatively engage said power means with said surfaces when such a system including the responsive devices is not in normal condition.

It is an object of this invention to provide a manually operable controller associated with the system for placing said system in normal condition whereupon said power means and control surfaces are automatically operatively associated.

It is a further object of this invention to provide a manually operable controller whose normal position may be changed and which will automatically return to said changed position when subsequently displaced therefrom.

It is a further object of this invention to utilize such controller in association with an automatic pilot to change the trim or attitude of an aircraft about a plurality of axes thereof while changing the normal position or homing position of said controller.

It is a further object of this invention to effect alterations in the attitude of said aircraft by operation of said controller with said aircraft returning to its original attitude upon release of said controller.

It is a further object of this invention to provide a manually operable controller for controlling the attitude of an aircraft and which controller indicates generally the trim of the aircraft as the homing position of the controller is changed.

It is a further object of this invention to provide a manually operable controller in an automatic pilot to condition said automatic pilot with respect to a plurality of axes of control prior to engagement of said automatic pilot with the control surfaces of an aircraft.

These and further objects of the invention will be apparent upon consideration of the accompanying description and drawing disclosing a preferred embodiment thereof.

The sole figure is a schematic arrangement of the novel automatic pilot.

Referring to the drawing, there is illustrated therein a three channel automatic pilot for an aircraft with means for operating the ailerons, rudder, and elevator. The ailerons (not shown) are operated from cables 10 extending from a cable drum 11. The cable drum is driven by a shaft 12 extending from an aileron servomotor 13. The servomotor 13 is reversibly controlled by an aileron amplifier 16 through an aileron engage relay 15 when the same is energized.

The aileron amplifier 16 includes a pair of single-pole double-throw double break double make relays 17 and 18 wherein the relay pole or member engages the break contacts with the relay unenergized and the make contacts with the relay energized. Thus the break contacts are relay unenergized contacts engaged by the member and the make contacts are relay energized contacts engaged by the member. Extending from the exterior of the aileron amplifier 16 are signal input connections 20, 21 and power input connections 35 and 19. The connections 35 and 19 are energized from a source of power such as the inverter (not shown) of the aircraft. Control signal voltages are applied across the signal input terminals 20 and 21 by means to be described. The relays 17 and 18 are operated in discriminator fashion in accordance with the phase relationship between the voltages across the signal input terminals 20, 21 and that across the power input terminals 35, 19. When the amplifier is not operating, the relays 17, 18 are in the out position shown. The servomotor and amplifier combination may be similar to that disclosed in the application of Willis H. Gille, Serial No. 447,989 or Patent 2,425,734, W. H. Gille et al.

The amplifier connections 20, 21 are included in a signal deriving system or circuit which comprises lead 20, impedance network 22, lead 39, impedance network 40, lead 47 to ground, and ground connection 21 of amplifier 16.

The impedance network 22 includes a servo balance potentiometer 23 having a resistor 24 and an adjustable slider 25, a vertical gyro bank potentiometer 26 having a resistor 27 and an adjustable slider 28, a ratio potentiometer 29 having a resistor 30 and an adjustable tap 31, and a transformer 32 having a primary winding 33 and a secondary winding 34. Resistor 24 of the servo balance potentiometer 23 and resistor 27 of the banking potentiometer 26 are connected in parallel across the secondary winding 34. The resistor 30 of the ratio potentiometer 29 is connected across a center tap of secondary winding 34 and the slider 25 of the servo balance potentiometer 23. The primary winding 33 of the transformer 32 is connected to a source of power which may be the inverter (not shown) of the aircraft. Connection 20 extends to the adjustable tap 31 of the ratio potentiometer 29. The slider 25 of the servo balance potentiometer is operatively driven from the aileron servomotor shaft 12. The slider 28 of the banking potentiometer 26 is operatively driven from a vertical flight gyro 36.

The vertical flight gyro 36 may be of the type well known in the art whose rotor is mounted in a casing for rotation about a vertical axis with said casing being carried by a cross gimbal support so that it may rotate about two respectively perpendicular horizontal axes. The vertical gyro 36 may be of the type disclosed in the aforesaid Gille application. The vertical gyro 36 is so supported in the aircraft that upon movement of the aircraft about the roll axis the slider 28 will move with respect to resistor 27.

The impedance network 40 comprises a manually operated banking potentiometer 41 having a resistor 42 and an adjustable slider 43 and a transformer 44 having a primary winding 33 and a secondary winding 46. The resistor 42 is connected across the ends of secondary winding 46 of the transformer 44. The slider 43 is manually adjustable by means to be described. Lead 39 extends from the slider 28 of the vertical gyro banking potentiometer 26 to the manually adjustable slider 43 of potentiometer 41. A lead 47 extends from a center tap of secondary winding 46 to ground. The transformer 44 is indicated as having a primary winding 33 similar to that of transformer 32 of network 22. This represents an arrangement wherein several secondary windings may have a common primary winding.

The rudder (not shown) of the aircraft is operated by cables 50 extending from a cable drum 51. The drum 51 is driven by a shaft 52 extending from a rudder servomotor 53. The rudder servomotor 53 is reversibly controlled by a rudder amplifier 56 through a rudder engage relay 55 when the same is energized.

The rudder amplifier 56 is provided with relays 57 and 58 operating as single-pole double-throw double-break relays. The amplifier includes signal input connections 60, 61; and power input connections 58, 59. The rudder amplifier 56 is similar to the aileron amplifier 16.

The signal input connections 60, 61 of amplifier 56 are included in a control system or circuit which comprises connection 61, variable impedance network 62, lead 79, voltage dividing potentiometer 80, lead 47, to ground, and to grounded connection 60 of amplifier 56.

The impedance network 62 includes a servo balance potentiometer 63 having a resistor 64 and an adjustable slider 65, a directional gyro rudder potentiometer 66 having a resistor 67 and an adjustable slider 68, a ratio potentiometer 69 having a resistor 70 and an adjustable tap 71, and a transformer 72 having a primary winding 33 and secondary winding 74. The resistor 64 of the balance potentiometer 63 and the resistor 67 of the directional gyro potentiometer 66 are connected in parallel across the secondary winding 74 of transformer 72. Resistor 70 of the ratio potentiometer 69 is connected across a center tap of secondary winding 74 and slider 65 of the balance potentiometer 63. Connection 61 of the amplifier 56 extends to the adjustable tap 71 of the ratio potentiometer 69.

Voltage dividing potentiometer 80 comprises a resistor 82 and an adjustable tap 81. The resistor 82 has one end connected to a center tap of secondary winding 34 of transformer 32 in network 22 and has its other end connected to lead 47 extending to ground from a center tap of secondary winding 46 in network 40.

The elevator (not shown) is operated by cables 90 extending from a cable drum 91. The drum 91 is driven by a shaft 92 extending from an elevator servomotor 93. The elevator servomotor 93 is reversibly controlled by an elevator amplifier 96 through an elevator engage relay 95 when the latter is energized.

The elevator amplifier 96 is similar to the aileron amplifier 16 and includes a pair of relays 97 and 98; a pair of signal input connections 101, 102; and power input connections 98, 99.

The signal input connections 101, 102 of amplifier 96 are included in a system or circuit which additionally includes a variable impedance network 102, lead 119, variable impedance network 120, lead 47 to ground, and to amplifier ground connection 102.

The variable impedance network 102 includes a servo balance potentiometer 103 having a resistor 104 and a slider 105, a vertical gyro pitch potentiometer 106 having a resistor 107 and an adjustable slider 108, a ratio potentiometer 109 having a resistor 110 and an adjustable tap 111, and a transformer 112 having a primary winding 33 and a secondary winding 114. Resistor 104 of the balance potentiometer 103 and resistor 107 of the pitch potentiometer 106 are connected in parallel across the secondary winding 114 of transformer 112. Resistor 110 of the ratio potentiometer 109 is connected across the slider 105 of potentiometer 103 and a center tap of secondary winding 114. Slider 105 is operatively driven by the elevator servomotor 93 from shaft 92. The slider 108 of the pitch potentiometer 106 is controlled by vertical gyro 36 by a suitable operating connection 113. The slider 108 and the resistor 107 are relatively displaced upon movement of the aircraft about the pitch axis. The tap 111 of the ratio potentiometer 109 is manually adjusted. Connection 101 extends from amplifier 96 to the adjustable tap 111.

Network 120 includes a manually adjustable elevator potentiometer 121 having a resistor 122 and an adjustable slider 123 and also the transformer 44. Resistor 122 is connected across the secondary winding 46 of transformer 44. Slider 123 is manually adjustable by means to be described. The lead 119 extends from slider 108 of vertical gyro pitch potentiometer 106 to slider 123.

A directional gyro 225 is used to sense movements of the aircraft about the turn or vertical axis of the craft. The gyro 225 includes a rotor (not shown) mounted in a casing 226 for rotation about a horizontal axis. The casing 226 in turn is trunnioned in a gimbal ring 228 for rotation about a horizontal axis 227 at right angles to the axis of rotation of the rotor. The gimbal ring 228 is supported for rotation about a vertical axis 229. An operating connection 230 extends from the gimbal ring 228 to the adjustable slider 68 of the directional gyro rudder potentiometer 66 of network 62.

The directional gyro 225 is of the restricted type, that is to say, its rotor may be moved to center position and held there by suitable caging mechanism.

One form of caging mechanism 231 comprises a solenoid plunger 233 supporting at one end thereof a hollow cone-shaped member 235 which may engage a member 238 extending from rotor casing 226. The plunger 233 is provided with an operating coil 232 for longitudinal movement thereof in one direction. The plunger 233 supports a plate 236. Interposed between the plate 236 and the operating coil 232 is a spring 237 which provides movement of the armature 233 in a direction to center the member 238 and cage or hold it in centered position thereby holding slider 68 in center position.

Reverting to the aileron channel, the aileron engage relay 15 includes an operating coil 115, four operable relay arms 124, 125, 126, and 127; and in contacts 128, 129, 130, and 131 which cooperate with arms 124, 125, 126, and 127 respectively. Contact 128 is connected to one end of coil 115. The opposite end of coil 115 is connected to a D. C. bus 132. Contact 129 is connected to one of the clutch solenoids of aileron servomotor 13. Contact 130 is connected to the other clutch coil of servomotor 13. Contact 131 is connected to the brake coils of servomotor 135 the servomotor connections being as disclosed in the aforesaid Gille application. Relay arm 124 is connected to ground. Relay arm 125 is connected to one of the in contacts of relay 17 of amplifier 16. Relay arm 126 is connected to an in contact of relay 18 in amplifier 16. Relay arm 127 is connected to D. C. bus 132. The D. C. bus 132 is connected to a main D. C. bus 133 through a ready-off single-pole single-throw switch 134. The end of relay coil 115 connected to contact 128 is also connected through an aileron engage switch 135, which is of the single-pole single-throw type, through the out contacts of relays 17 and 18 to ground.

The engage switch 135 is operable by manual means to be described.

The rudder engage relay 55 includes an operating coil 143, four relay arms 144, 145, 146, and 147; and four in contacts 148, 149, 150, and 151 which coact with the relay arms 144, 145, 146, and 147 respectively. A lead 152 extends from contact 148 to a manually operated control switch 198 to be described. Contact 149 is connected to one of the clutch solenoids of rudder servomotor 53. Contact 150 is connected to the other clutch solenoid of servomotor 53. Contact 151 is connected to the brake coils of servomotor 53 all as in the aileron servomotor 13. Relay arm 144 is connected by lead 153 to the operating coil 132 of the caging mechanism 131. Relay arm 145 is connected to one of the in contracts of relay 57 of amplifier 56. Relay arm 146 is connected to one of the in contacts of relay 58 in amplifier 56. Relay arm 147 is connected to D. C. bus 132. Relay coil 143 has one end connected to bus 132 and has its opposite end connected to the switch arm of the aileron engage switch 135.

The elevator engage relay 95 includes an operating coil 153, for operable switch arms 154, 155, 156, and 157; and four in contacts 158, 159, 160, 161 which coact with the switch arms 154, 155, 156, and 157 respectively. One end of relay coil 153 is connected to bus 132. The opposite end of this relay coil is connected to contact 158 and through a parallel connection comprising elevator engage switch 164, out contacts of relays 97 and 98 of elevator amplifier 96 to ground. The engage switch 264 is of the single-pole single-throw type and is manually operable by means to be described. Contact 159 is connected to one of the clutch coils of elevator servomotor 93. Contact 160 is connected to the other clutch coil of servomotor 93. Contact 161 is connected to the brake coils of servomotor 93. The above servo connection being similar to those for aileron servo 13. Switch arm 154 of relay 95 is connected to ground. Switch arm 155 is connected to one of the in contacts of relay 97 of amplifier 96. Switch arm 156 is connected to an in contact of relay 98 in amplifier 96. Switch arm 157 is connected to the D. C. bus 132.

A manually operable controller 164 is provided for the operator of the aircraft. The controller 164 includes an upstanding central member 165. The upper end of the central member 165 supports a cap element 170 by means of a spring 171 between a stop 172 on the central member and the closed end of the cap element. The cap element 170 has inwardly extending stop elements 173 which coact with the stop 172 to limit the movement of the cap element. It is evident that the element 170 may be given telescoping movement with respect to the central member 165 and that when released the spring means 171 restores the cap element to its original position. The lower end of the central member 165 is fixed to a cross member 166 of roughly rectangular cross-section. The cross member 166 is carried by two side plates 167 and 168. The side plates 167, 168 are fixed to a shaft 169 which is trunnioned in a longitudinally extending body member 188. It will be evident that when the central member 165 is moved fore and aft that a motion similar to that provided in the conventional "stick" for elevator action is provided about the axis of shaft 169. The central member 165 during its movement about axis of shaft 169 energizes a restoring means. This restoring or return means for the purpose of illustration consists of a clutch 273 and a spring element 175. The clutch 273 includes one portion 271 carried by shaft 169. Loose on shaft 169 is another clutch portion 272 which is held in clutching engagement with portion 271 by a biasing spring 174 encircling the shaft 169.

With the clutch members engaged by the action of spring 174, rotation of the central member 165 about the axis of shaft 169 causes the flexing of the restoring means 175 indicated as a flat spring. Upon release of the central member 165 the restoring means 175 moves the central member to its normal position with respect to the axis of shaft 169. The declutching of the clutch members 271 and 272 is effected upon depression of the cap element 170 by an operative connection 276 extending from the cap element to the clutch 273.

Extending from both ends of said body member 188 are trunnions 176 and 177 carried respectively by pillow block bearings 178 and 179. Between the trunnion 177 and the pillow block 178 is a clutch and spring return mechanism consisting of the clutch 181 and the centering spring member 184. The clutch consists of clutch element 182 fixed to trunnion 177 and a clutch element 183 loosely supported on said trunnion and biased into clutching engagement with the clutch element 182 by the spring 185. A centering spring 184 connects element 183 to bearing 178. Upon movement of the central member 165 about the axis of trunnions 176 and 177 the spring means 184 is energized so that upon release of the central member 165 the same is restored to its normal position.

A declutching operator 187 extends from the cap element 170 to the clutch 181 for separating the clutch elements 182 and 183 upon depression of the cap element. The clutch element 183 is operatively connected to a cam 180 for a purpose to become apparent.

A directional gyroscope caging control switch 190 is associated with the manually operable controller 164. The switch 190 consists of two switch blades 191 and 192 which have contacts normally biased toward disengaged position by spring means 193. A cam follower 194 carried by the switch blade 192 bears against the cam 180 driven by clutch element 183. The operation of the central member 165 about the axis of trunnions 176, 177 with cap element 70 elevated causes the high point of the cam 180 to leave the follower 194 whereupon the spring means 193 opens the circuit through switch 190.

An operating connection 195 extends from trunnion 177 to slider 43 of the banking potentiometer 41. An operating connection 196 extends from shaft 169 to the slider 123 of the elevator potentiometer 121.

The cap element 170 of the manually operable controller has an operating connection 186 extending to the aileron-rudder engage switch 135 and to the elevator engage switch 264. Also extending laterally from element 170 is a switch actuator 197 which serves to separate normally closed switch contacts 198, 199 upon depression of the cap element 170 which depression also closes the switches 135, 264.

*Operation*

The operation of the above described apparatus will be considered where the aircraft is air-borne and it has been placed in normal attitude about the roll and pitch axes of the aircraft by manually operating the control surfaces and it is now desired to provide automatic operation of the control surfaces of the aircraft as well as manual control thereof through the automatic pilot.

With the aircraft air-borne as stated but the servomotors disconnected from their respective control surfaces, the directional gyro 225 is in a caged condition. This is apparent because the operating coil 232 of the caging mechanism 231 has its circuit open by the separation of the arm 144 from the in or make contact 148 in the rudder engage relay 55.

We may now consider the condition of the input circuits for the various amplifiers. Respecting the aileron amplifier, with the ailerons unoperated and the craft level about the roll axis, the slider 28 of network 22 which slider is operated by vertical gyro 36 is at the electrical center of its resistor 27. If the slider 43 of manually operable bank potentiometer 41 is not at the center of its resistor 42, its potential differs from that of the center tap of secondary winding 46. Furthermore slider 25 of the rebalancing potentiometer 23 may not be at the center of resistor 24 and consequently sliders 25 and 28 will not be at the same potentials. In such a situation, unless the potential between sliders 25 and 28 is equal and opposite to that between slider 43 and the center tap of secondary winding 46, the input circuit of amplifier 16 is in unbalanced condition.

With respect to the rudder amplifier input circuit and considering the rudder in streamlined position, the slider 65 of the balance potentiometer 63 will be at its center position, consequently the network 62 of input circuit of the rudder amplifier 56 is in balanced condition.

In the input circuit of elevator amplifier 96, the servo balance potentiometer 103 may or may not be in the center of resistor 104 depending on angle of attack of the aircraft. With the aircraft level about the lateral or pitch axis, the vertical gyro pitch axis potentiometer 106 has its slider 108 centered with respect to resistor 107. The slider 123 of the manually operable elevator potentiometer 121 may be displaced from the center of its resistor 122 and the slider 123 will then have a different potential than the center tap of secondary winding 46. Thus the input circuit of elevator amplifier 96 is in unbalanced condition unless the potential between the rebalancing potentiometer slider 105 and slider 108 of potentiometer 106 is equal and opposite to the potential between slider 123 and the center tap of secondary winding 46.

With the ready switch 134 in closed position, the energization of the engage relays 15, 55, and 95 depends not only upon the operation of the aileron and elevator manually operable engage switches 135 and 264 but also depends upon the bridging of the out contacts of relays 17, 18 of aileron ampliger 16 and relays 97 and 98 of elevator amplifier 96. As a preliminary to engaging the automatic pilot, the operator depresses the cap element 170 which closes switches 135 and 264. The aileron and rudder channels will be engaged together whereas the elevator channel is separately engaged. The operator moves the member 165 about the axis of trunnions 176, 177 to adjust the slider 43 of potentiometer 41 without moving slider 123. The adjustment of slider 43 will cause the rebalancing of the input circuits of the aileron amplifier 16 and the rudder amplifier 56. Upon balance being reached and the engage switch 135 being previously operated by depression of cap 170, the aileron and rudder engage relay coils 115 and 143 are energized through the out contacts of amplifier relays 17, 18, since both amplifier input circuits are now balanced and the relays are out, and the engage relays move to the in position. At this time the aileron and rudder servomotors are operatively associated with their respective control surfaces since their respective brake coils are energized through arm 127, contact 131 and arm 147, contact 151 respectively.

Any further movement of the member 165 and the consequent further movement of slider 43 at this time, after the aileron and rudder engage relays have operated, will cause the unbalance of the aileron and rudder amplifier input circuits and will result in the operation of the ailerons and rudder servomotors by the energization of their respective clutch coils. The rudder amplifier derives a signal in this manner. Thus the pilot senses that he has balanced the aileron and rudder amplifier input circuit since the craft now follows the movements of the member 165. The purpose of balancing the networks before permitting engagement of the servo motor with their control surfaces is to prevent any otherwise unbalanced signal to effect amplifier and motor operation and thereby cause a lurch of the aircraft.

It will be seen that network 40 and the vertical gyro banking potentiometer 26 are connected in opposition so that any difference in voltage across the vertical gyro banking potentiometer 26 and across the manually operable banking potentiometer 41 is applied across the resistor 82 of potentiometer 80. A portion of this voltage is selected by adjustable tap 81 and is applied to the input circuit of the rudder amplifier 56. Thus the adjustment of the slider 41 unbalances the input circuit of the aileron amplifier 16 and the rudder amplifier 56 resulting in adjustment of the ailerons and rudder as stated and the operation of their servo balance potentiometer sliders until the respective networks are in balanced condition. The operation of the ailerons will cause the aircraft to follow the movements of the manually operated control member 165. In other words after the aileron and rudder bridge networks have been balanced, the operator becomes aware of the engaging condition of the aileron and rudder servomotors by the fact that the aircraft follows the movement of the control member 165 upon its further movement after such balance is attained.

During the time that the aileron and rudder bridge networks were being balanced the cap element 170 is held in a depressed position so that the clutches 273 and 181 are in open condition with the centering spring means 175, 184 disassociated from member 165.

The control member 165 may be moved about the axis of trunnions 176 and 177 so that the aircraft is again in its level position about the roll axis although member 165 may be displaced from the vertical position. With the automatic pilot now engaged with respect to the roll and turn axes control surfaces of the aircraft, the control member 165 is moved about the axis of shaft 169 to engage the automatic pilot with the elevator. This movement adjusts the slider 123 until the input circuit of the elevator amplifier 96 is in balanced condition. Upon balance being attained, the coil 153 of the aileron engage relay 95 is energized through operated engage switch 264 and the unoperated or out contacts of relays 97 and 98 of amplifier 96. Member 165 may be subsequently adjusted to obtain proper pitch axis attitude.

With the automatic pilot including the servomotors thus engaged with their respective control surfaces due to the balancing of the bridge networks in the three channels of the automatic pilot by the operation of the control member 165, the operator may release the cap element 170. With the cap element 170 in the elevated position, the clutches 273 and 181 are engaged to associate the centering means 175 and 184 with the control member 165.

The circuit for the operating coil 232 of caging mechanism 231 is completed from coil 232, lead 163, contact arm 144, in contact 148, lead 152, the now engaged switch contacts 198, 199, lead 200, closed switch 190, lead 201, to bus 133. The directional gyro 225 is now uncaged. The aircraft is now engaged with the automatic pilot for automatic stabilization on the heading of the aircraft attained when the directional gyro was uncaged, by its operation of potentiometer 66. The aircraft will also be stabilized about the roll and pitch axes in a manner well known to those skilled in the art by the signals obtained from potentiometers 26 and 106 as controlled by vertical gyro 36.

Should the operator desire to change the course or heading of the aircraft, he operates the member 165, without depressing cap 170, about the axis of trunnions 176, 177 depending upon the direction in which the change of course is to be made. Movement of the member 165 with the cap 170 in elevated position also moves the clutch element 183 which is now engaged with the clutch element 182 on shaft 177. This movement of the clutch element 183 moves the cam element 180 away from follower 194 to permit spring 193 to open contacts 191 and 192 of switch 190. The circuit for the operating coil 232 is broken, and the spring 237 cages the directional gyro 225 thereby centering the slider 68 with respect to resistor 67 and maintaining it in this position.

The movement of member 165 about the axis of trunnions 176, 177 also adjusts the slider 43 of potentiometer 41 whereby a signal is applied to the input circuit of aileron amplifier 16. A signal is also applied to the rudder amplifier input circuit by means of the voltage divider 80. The aileron and rudder servomotors 13 and 53 position their respective control surfaces and also their respective follow up sliders 25 and 65 to respectively balance the aileron and rudder amplifier input circuits.

Under the applied aileron and rudder displacements, the aircraft banks and turns. The vertical gyro 36 in response to the bank of the aircraft adjusts the slider 28 of potentiometer 26 which causes an opposite unbalance of the input circuit of aileron amplifier 16 and also through the voltage divider 80 causes an opposite unbalance of the input circuit of rudder amplifier 56. The aileron amplifier 16 and the rudder amplifier 56 operate and cause their respective aileron and rudder servomotors to drive the aileron and rudder back toward normal position and to drive their reblancing potentiometer sliders 25 and 65 back toward normal position.

As the aircraft approaches the heading which the operator desires the aircraft to maintain, he gradually releases the control member 165 which under the action of centering spring 184 moves toward its normal position at which time the slider 43 of potentiometer 41 is moved back toward normal position. Signals are applied to the aileron and rudder amplifiers resulting in the opposite displacement from normal position of the aileron and rudder from that which they assume when initiating the turn. The aircraft under opposite ailerons tends to move toward a level position upon release of the member 165.

With the aircraft in level position again and the member 165 in its restored position, the aircraft is on its new heading with the circuit for coil 232 completed whereby the directional gyro is uncaged.

The angle of attack at which the aircraft flies may be altered by an operation of the control member 165 about the axis of shaft 169. In order to change the altitude of the aircraft and yet regain the angle of attack that the craft had initially, the cap element 170 is not depressed as the member 165 is rotated about the axis of shaft 169. This movement adjusts the slider 123 of potentiometer 121 thereby unbalancing the input circuit of elevator amplifier 96 with the resulting operation of the elevator and the movement of the rebalancing slider 105 of the rebalancing potentiometer 103. As the aircraft tilts due to the application of elevator, the vertical gyro 36 through its operating connection 113 moves the slider 108. If up elevator is being applied the slider 108 assumes a position relative to that of slider 105 to balance the signal due to the manual displacement of slider 123 consequently for change in angle of attack the elevator is in a new position. After the desired altitude at the new angle of attack has been attained, the control member 165 is gradually released and the restoring means 175 moves the control member 165 and slider 123 back to normal position. In this operation the elevator amplifier 96 has its input circuit unbalanced so that the elevator is moved back to normal position to maintain the aircraft in the original angle of attack.

While the operation of engaging the automatic pilot with the control surfaces has been described in connection with the condition wherein the aircraft is in level position about the roll and pitch axes, it is also possible to engage the automatic pilot when the aircraft is not in a level position about either the roll or pitch axis. This is evident from the following.

Assuming the automatic pilot to be disengaged from the control of surfaces and the aircraft tilted with respect to the roll axis. The ready switch 134 is assumed to have been closed and the operator depresses the cap 170 and moves the member 165 about the axis of trunnions 176, 177. The movement of member 165 as before adjusts the slider 43 to balance the input circuit of the aileron amplifier 16 and the rudder amplifier 56. After balance is attained the aileron servomotor and rudder servomotor are engaged with their control surfaces as described.

The aircraft with the control surfaces in neutral or streamlined position is still in a banked attitude with respect to the roll axis. The operator adjusts the member 165 and the slider 43 subsequent to the balancing of the rudder and aileron channels. This movement results in a signal being applied to the aileron and rudder amplifiers causing the operation of the ailerons and rudder. The aircraft under the applied aileron tends to move toward level position whereas the effect of the displaced rudder is to coordinate recovery to level attitude. The aileron and rudder servomotors operate their respective follow up or rebalancing potentiometer sliders 25, 65 to rebalance the aileron and rudder input circuits.

Under the applied aileron and rudder the aircraft moves toward level flight position and the vertical gyro 36 in response to the change in attitude of the aircraft adjusts its slider 28 of potentiometer 26. The operator adjusts the control member 165 to permit the craft to attain its level position with respect to the roll axis. At this time the cap 170 may be released to associate the spring centering means 184 with the movement of member 165 about the roll axis.

It is evident that if the aircraft were laterally inclined about the roll axis toward the right that the control member 165 could be operated to place the aircraft in a level position about the roll axis in a manner similar to that above considered where the aircraft was inclined toward the left about the roll axis.

In a similar manner if the aircraft be not level with respect to the pitch or lateral axis thereof, the member 165 may be rotated about the axis of shaft 169 to initially engage the elevator servomotor with the elevator control surface and thereafter the member 165 may be adjusted to bring the aircraft in level attitude about the pitch axis or desired attitude.

Another operation of the control member 165 permits the setting up of a predetermined rate of turn of the aircraft which will be continued without the operator maintaining control of the member 165. In setting up a predetermined rate of turn, the operator depresses the cap 170, assuming the automatic pilot is now engaged, and rotates the member 165 about the axis of trunnions 176, 177 corresponding to the direction of turn desired. The aircraft now banks and turns under the applied aileron and rudder displacement resulting from the adjustment of slider 43 of potentiometer 41. The directional gyro 225 is caged due to the opening of the circuit of coil 232 at switch contacts 198, 199.

After the aircraft has assumed a desired rate of turn, the operator releases the cap element 170 while momentarily holding the control member 165 in its adjusted position. The centering spring means 184 and 175 now bias the control member 165 into its position assumed during the rate of turn being set up. The aircraft will continue turning at the rate of turn set up by the adjustment of the control member 165. When the operator desires to stop turning of the aircraft, he depresses the cap element 170 and moves the member 165 back toward its normal position whereby opposite aileron and rudder displacements are obtained to remove the bank of the aircraft and to steady the craft in a direction to be maintained.

It is thus possible for the operator to set up an initial rate of turn from which deviations of rate of turn may be applied by moving the member 165 after the centering means 184 and 175 have been associated with the control member 165. This rate of turn set up will be regained upon the operator releasing the control member 165 whereby it will be restored to the position assumed during the setting up of the rate of turn desired.

Similarly a predetermined rate of climb or descent may be set up by depressing cap 170 and moving member 165 about the axis of shaft 169. When the rate of climb or descent has been attained, cap 170 is released and the biasing means 175 will maintain the member 165 at the position for the desired rate of climb or descent.

The member 165 may also be operated to change the trim of the craft about the roll or pitch axes. To this end the member 165 is moved after depressing cap 170 until the desired trim condition of the craft is reached whereupon cap 170 is released. The new attitude of the craft will be maintained with the homing position of the controller 165 altered to that position attained when the cap 170 is released.

In conclusion, it is now apparent that there has been provided a novel manually operable controller which may be operated to place a plurality of control channels of an automatic pilot in a normal or balanced condition, and that the placing of such channels in a normal condition is automatically followed by an engagement of such channel with its respective control surface. Further, there has been provided means associated with the manually operable controller for changing the normal homing position of such controller to alter the trim of the aircraft with respect to a particular axis desired. Further that the attitude of the aircraft may be manually altered with respect to this trim position by operation of the manual controller with the aircraft however returning to its trim condition automatically upon release of the manually operable controller.

While a preferred embodiment of the invention has been disclosed, it is desired that the invention be not restricted to the particular details described but is to be determined by the appended claims.

I claim as my invention:

1. In control apparatus for an aircraft, power means for controlling the attitude of said aircraft; an amplifier; a balanceable control circuit for said amplifier; manually operable means for controlling the balance of said control circuit; amplifier operated relay means comprising a winding and an operable arm movable on energization of the winding between an unoperated and operated position, said winding being energized by said amplifier on unbalance of said circuit; and circuit providing means including operable relay means controlled by said relay arm in its unoperated position for connecting said relay arm of said amplifier operated relay with said power means when in subsequent operated position.

2. In control apparatus for an aircraft having means including a motor for operating a control surface thereof, an amplifier, a balanceable circuit for controlling said amplifier, adjustable means for providing a signal of opposite polarities in said circuit depending on the positioning of said adjustable means, means for controlling the direction of movement of said motor from said amplifier in accordance with the polarity of said signal, biasing means extending from said aircraft and engageable with said adjustable means for determining a normal position thereof, and manually operable means for disengaging said engageable biasing means with said adjustable means and for thereafter reengaging said engageable biasing means with said adjustable means for varying said determined normal position.

3. In control apparatus for an aircraft having two control surfaces for controlling the position of said craft about two axes, two motor means, each motor means having further means for effecting connection or disconnection of a motor means and a control surface, for positioning a surface from a motor means during such connection, a separate amplifier for each motor means, a balanceable signal voltage network for operating each amplifier, a source of signal voltage common to both networks, attitude means for unbalancing each network during direct manual control of said control surfaces of said craft with each motor means disconnected from its control surface, means for adjusting said signal voltage source to balance both networks, control means for controlling said further means for operatively connecting each motor means with its control surface, and means for operating said control means and controlled by the balance of said networks.

4. Control apparatus for an aircraft having angularly movable control surfaces for changing the attitude of said craft about a plurality of axes and power means which may be operatively associated therewith for movement thereof, said apparatus comprising: a plurality of power means operation control means each having output members with operated and unoperated positions and including a balanceable control system; an aircraft tilt responsive device and a manually operable controller for affecting the balance of all control systems; and operable connecting means joined to the members in each control means and having an effective position controlled jointly by the two members of one control means in their unoperated positions for effecting the operative association of the said power means with the control surfaces and the control means with the power means upon the placing of one system associated with the two unoperated members in normal balanced condition by operation of said controller whereby said tilt responsive device may assume stabilizing control of said craft without lurch thereof if said responsive device be originally displaced from normal position.

5. In control apparatus for an aircraft, power means for operating a control surface thereof for changing the attitude of said aircraft about an axis; control means connected thereto for effecting reversible operation of said power means said control means including a manually operable controller; biasing means between said manually operable controller and aircraft for returning said controller to a normal position from an operated position; disconnectable clutch means having a part connected to said controller and a part connected to said biasing means; and a mechanism for effecting the disconnection of said clutch means for selectively associating or dis-associating said controller with said biasing means.

6. Control apparatus for an aircraft having a control surface, said apparatus comprising: power means for reversibly operating said surface for controlling the attitude of said aircraft about an axis; control means for effecting operation of said power means including a system having a variable signal providing means; attitude responsive means; a manually operable controller; means whereby said attitude means and manually operable controller are operably connected to said signal means for providing a signal in accordance with the differential operation of said attitude means and controller; disconnectable biasing means between said manually operable controller and aircraft for returning said controller to a normal position; and operable means on the manually operable controller for selectively connecting said biasing means with said manual controller whereby with said biasing means disconnected, said manually operable controller may be adjusted to place the craft in a selected attitude and the biasing means thereupon connected so that upon subsequent operation and release of said manually operable controller said craft returns automatically to said selected attitude.

7. Control apparatus for an aircraft comprising: power means for controlling the attitude of said aircraft about an axis thereof; control means for effecting operation of said power means including a balanceable electrical system having variable electrical signal deriving means; attitude means responsive to craft tilt; a manually operable rotatable controller; means connecting said attitude means and said manually operable conroller with said signal deriving means for providing a signal proportional to the difference in movement of said attitude means and controller; return means for said controller connected between said craft and controller; an operable means on said controller for disconnecting said controller and said return means while said system is unbalanced and for connecting said controller with said return means after balance to provide an attitude for said aircraft that is automatically regained upon subsequent operation and release of said controller.

8. Control apparatus for an aircraft having a control surface, said apparatus comprising: control surface servomotor means; control circuit means including a voltage phase discriminating amplifier having a pair of relays alternatively energized in accordance with a voltage applied to the control circuit means, each relay having an operable member for alternatively engaging relay energized contacts and relay unenergized contacts; connections for reversibly controlling said servomotor means through said relay energized contacts; a manually operable controller for providing signals of opposite polarity to said control circuit means for operating said control circuit means to selectively operate one or the other relay; servomotor operation transmission effecting means including operable means connected to the relay unenergized contacts for operatively connecting said servomotor means with said control surface; and holding means for said operable means connected to said transmission effecting means and operated during the connection of the power means and control surface for thereafter maintaining said connection despite subsequent energization of one or the other amplifier relay.

9. Control apparatus for an aircraft having control surfaces which may be manually or power operated for controlling the attitude of the aircraft about a plurality of axes thereof, said apparatus comprising: a pair of surface operating power means; a control means connected to each power means for effecting operation thereof, each control means including a balanceable circuit for providing a signal upon unbalance of said circuit to operate said control means during such unbalance; follow-up means in each balanceable circuit positioned with its surface during direct manual or power operation thereof; a manually operable controller movable in two planes at an angle to each other; means for connecting said controller to each balanceable circuit whereby one circuit may be balanced upon movement of the controller in one plane and the other circuit may be balanced upon movement of the controller in the other plane; further means in each power means connected to said manually operable controller and to each control means and jointly controlled thereby for operatively connecting each power means with its control surface upon its respective control means circuit attaining balance condition during movement of said controller.

10. Apparatus according to claim 9, said manually operable controller being movable about two axes and changing the balance of one circuit upon movement about one axis and changing the balance of the other circuit upon movement about the other axis; a biasable return means between a fixed and movable part of each axis; and selectively operable means for connecting or disconnecting said manually operable controller with said biasing means.

11. Apparatus according to claim 9, including means conditioned during operatively connecting a said power means and control surface for maintaining the operative relation of each power means and its control surface despite subsequent movement of said controller.

12. Apparatus according to claim 9, including attitude means, and means for connecting said attitude means with each balanceable circuit so that said circuits have their conditions of balance additionally responsive to said attitude means.

13. In control apparatus for a dirigible craft, power means for controlling the attitude of said craft about an axis thereof; a balanceable control means connected to said power means for effecting operation of said power means on unbalance of said control means; craft attitude responsive means connected to said balanceable control means for affecting the balance thereof upon change in craft attitude; a manually operable controller; connectable controller return means between the craft and the controller; operable means extending from said controller to said balanceable control means for adjusting the balance of said control means to offset the effect of said attitude means on said control means to null the balanceable control means for any attitude of said craft about said axis; and means for disconnecting said return means from said manual controller during such adjustment of the balanceable control means.

14. In control apparatus for an aircraft, power means for operating a control surface thereof for changing the attitude of said aircraft about an axis; control means connected thereto for effecting reversible operation of said power means said control means including a manually operable controller; biasing means between said manually operable controller and aircraft for returning said controller to a normal position from an operated position; disconnectable clutch means having a part connected to said controller and a part connected to said biasing means; means to effect disconnection of said clutch means to permit operation of the controller and of the power means to change attitude without biasing the controller and to effect subsequent connection of said clutch means, to alter the normal biased position of the controller.

References Cited in the file of this patent

UNITED STATES PATENTS

| 1,418,335 | Sperry | June 6, 1922 |
| Re. 19,233 | Hendrickson | July 10, 1934 |
| 2,466,702 | Hamby | Apr. 12, 1949 |
| 2,471,821 | Kutzler et al. | May 31, 1949 |